United States Patent [19]

Alton

[11] Patent Number: 5,492,402
[45] Date of Patent: Feb. 20, 1996

[54] COMBINATION TRAILER AND SELF PROPELLED VEHICLE

[76] Inventor: Rex Alton, R.R. 5, Vincennes, Ind. 47591

[21] Appl. No.: 376,904

[22] Filed: Jan. 23, 1995

[51] Int. Cl.[6] ....................................... B28C 5/18
[52] U.S. Cl. ................. 366/61; 180/242; 180/307; 180/308; 180/321; 180/326; 366/44
[58] Field of Search .................. 366/54–61, 44, 366/220, 233, 187, 189; 180/242, 305, 307, 308, 321, 326

[56] References Cited

U.S. PATENT DOCUMENTS

| | | | |
|---|---|---|---|
| 3,209,850 | 10/1965 | Fish | 180/242 |
| 3,218,045 | 11/1965 | Cox | 366/61 |
| 3,371,543 | 3/1968 | Jackson | 366/60 |
| 3,705,638 | 12/1972 | Shock | 180/305 |
| 4,031,976 | 6/1977 | Lambert | 180/242 |
| 4,361,200 | 11/1982 | Igarashi | 180/321 |
| 4,846,581 | 7/1989 | Osterlund | 180/321 |
| 5,020,627 | 6/1991 | Wittke | 180/242 |
| 5,207,060 | 5/1993 | Sheets | 180/242 |

*Primary Examiner*—Robert W. Jenkins

[57] ABSTRACT

The present invention is a combination trailer and self propelled vehicle which combines the maximum gradeability of all wheel drive with the ability to be efficiently and conveniently towed by conventional means at maximum permissible highway speeds. As this invention relates to concrete mixing, it provides an advance in the ability to get to a job site quickly and then efficiently transport and place concrete mix at the job site.

11 Claims, 6 Drawing Sheets

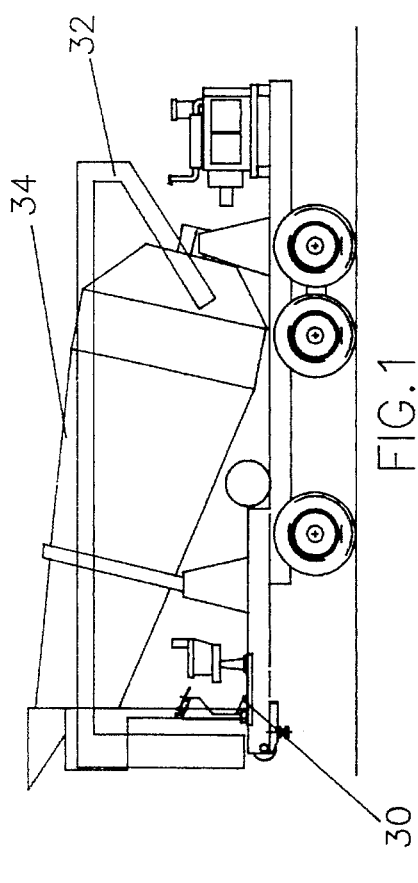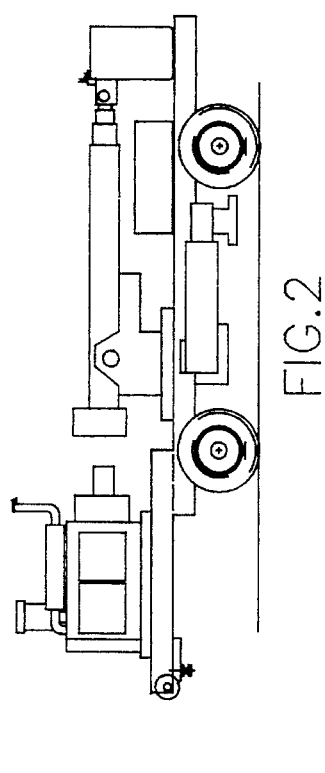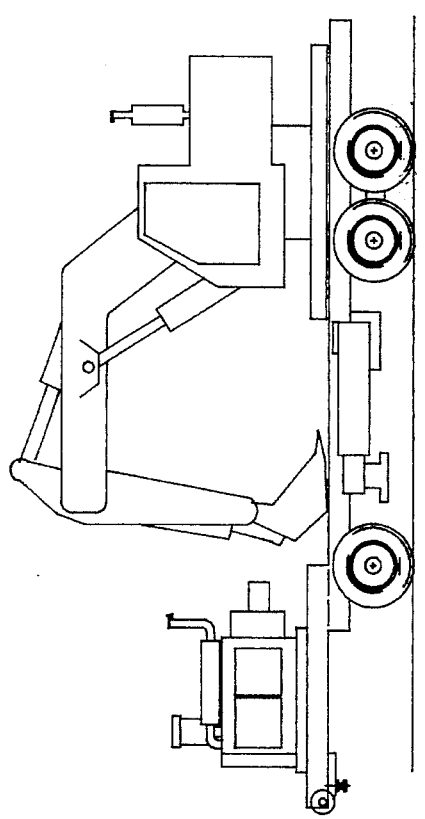
FIG.1 FIG.2 FIG.3 FIG.4

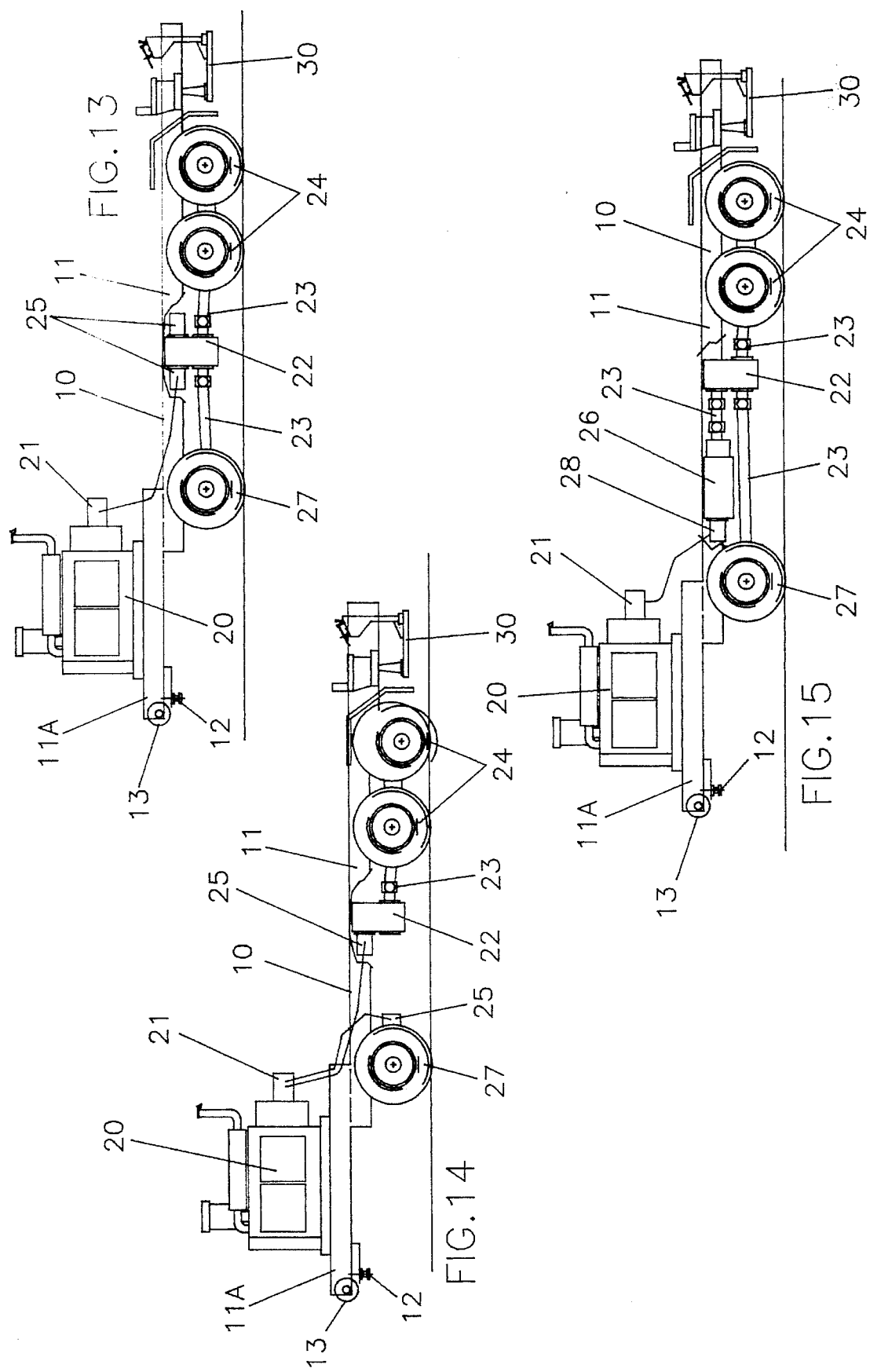

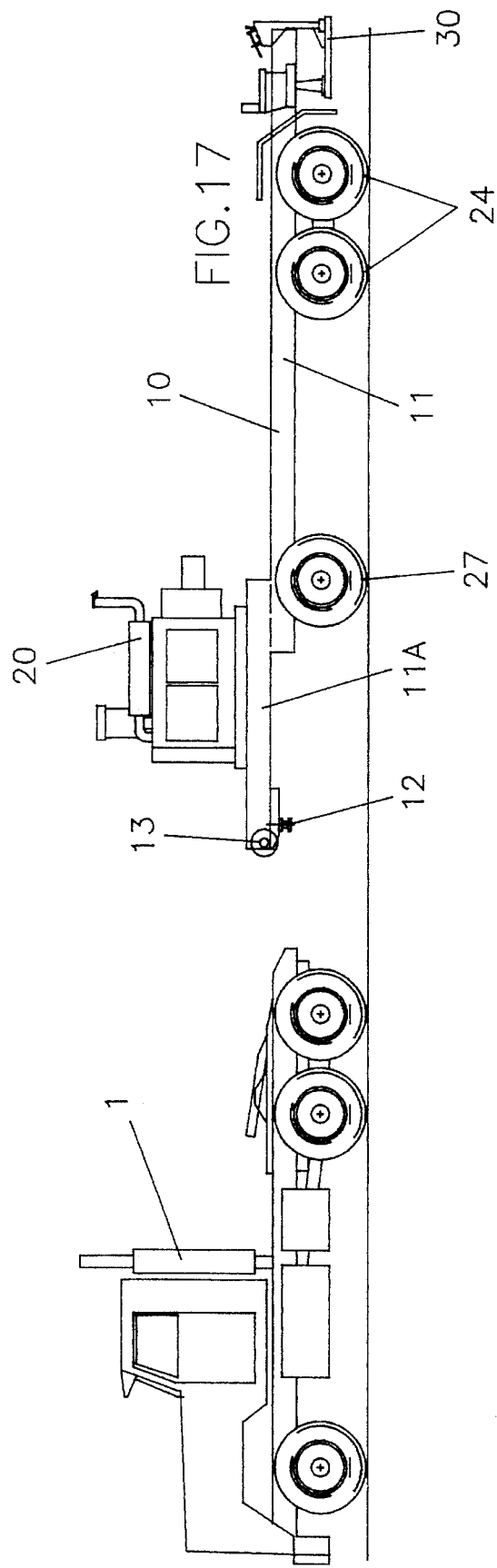
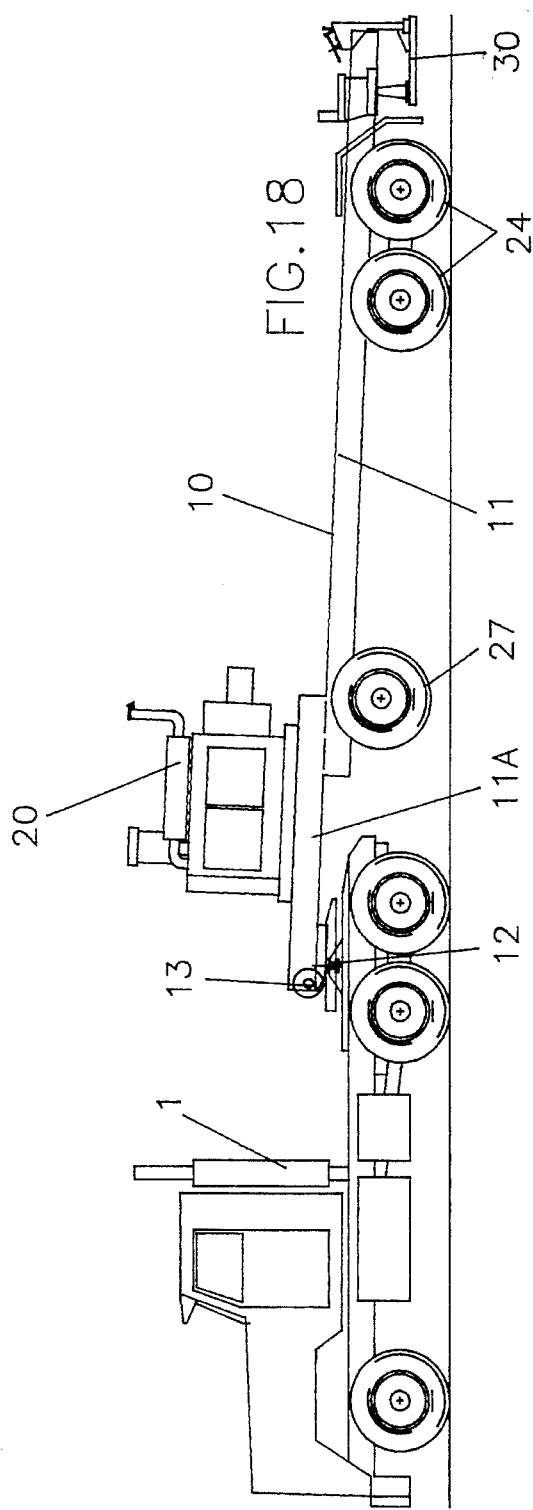

COMBINATION TRAILER AND SELF PROPELLED VEHICLE

BACKGROUND—FIELD OF INVENTION

This invention relates to a self propelled vehicle that is towable at maximum permissible highway speeds.

BACKGROUND—DESCRIPTION OF THE PRIOR ART

Several patent searches were conducted over the years. Among the classes and sub-classes searched were Class 280, Sub-Classes 402, 418.1, and 33,991; and Class 180, Sub-Class 14.1, 14.2, 14.3, 24.02, 24.05, and 24.06. Patents discovered:

| | | |
|---|---|---|
| 3,123,380 | 03/03/1964 | Grim et al |
| 3,209,850 | 10/05/1965 | Fish |
| 3,285,449 | 11/15/1966 | Hand |
| 3,594,018 | 07/20/1971 | Graetz |
| 3,635,300 | 01/18/1972 | Gibbs |
| 3,656,780 | 04/18/1972 | Gustaf |
| 3,680,720 | 08/01/1972 | Strange |
| 3,705,638 | 12/12/1972 | Shock |
| 4,031,976 | 06/28/1977 | Lambert |
| 4,542,990 | 09/24/1988 | Fouquet |
| 4,625,821 | 12/02/1986 | Aumont et al |
| 4,685,527 | 08/11/1987 | Oswald et al |
| 4,824,316 | 04/25/1989 | Cobb |
| 5,040,815 | 08/20/1991 | Evans |
| 5,056,984 | 10/15/1991 | Hesterman |

The four most relevant prior art patents seem to be 3,209,850 by Fish, 3,705,638 by Shock, 4,031,976 by Lambert and 4,625,821 by Aumont et al.

Fish has a trailer with driven rear wheels. It is not a trailer that can be self-propelled once it is detached from the tractor which tows the trailer.

Shock shows a single wheel wheel drive adequate for a relatively light weight trailer. The Shock invention does not have the gradeability of the present invention.

Aumont et al is concerned with an auxiliary drive on a trailer, to supplement the tractor drive. This is different from the present invention.

Lambert is concerned with using less power to maneuver a crane around the job site. It does not address the problem of improving gradeability. Only the one group of wheels are powered on the job site, the steering wheels are not powered. This limits the tractive effort and gradeability of the machine as compared to driving all of the trailer wheels, as is done by the present invention.

Currently there are a variety of hydraulic driven machines, that are speed limited such that rapid transport is a problem, short of mounting the machine on a low boy trailer. Examples include, but are not limited to, a variety of construction and agricultural equipment.

For example, construction machinery that is hydraulic fluid power driven is limited in the maximum speed, so the times required to travel to and from the job sites can be excessive. Construction machinery that is mechanically driven by the engine powering the wheels via transmissions, gears, drive lines, etc. are limited in gradeability at the job site. The present invention combines the off-highway gradeability of hydraulics with rapid transport to and from the job site.

Beyond construction machinery, there is a need for farmers to be able to move heavy loads in and from muddy fields, yet move down the highway in a timely manner.

There is also a need for contractors to be able to move a variety of equipment and materials around the job site in an expeditious manner, yet not be speed limited on the highway.

A limitation in traditional truck designs, is that they are intended for on highway operation. While there is a multiplicity of gear ratios available, the machines really don't work very well off-highway. Also, the tires are a compromise to permit some off-highway traction, but still be able to travel at highway speeds without excessive noise and wear. In the present invention, when towed, the steerable wheels are raised above the highway surface, so the tires can even be lugged as agricultural tractor tires are, for maximum off highway traction.

My invention combines the high gradeability of all wheel drive and smooth starting and operation off highway with a convenient and practical means of high speed highway travel.

A standard highway truck tractor is used for towing. Such a tractor is quite comon to farmers and contractors.

Off-highway, fluid power drives permit maximum torque at the wheels, for good traction and gradeability in muddy fields. However, the drives are limited to less than desirable maximum speeds for on highway driving. Once the hydraulic motors are selected for adequate torque, for initial start up conditions, the volume of oil required for turning the motors at highway speeds becomes impractical.

Attempts are made to drive multiple speed range transmissions with high speed low torque axial piston motors, to attain the desired starting torque required yet also be able to achieve a respectable motive speed. This hasn't worked very well out in the real world.

Equipment driven by high speed low torque hydraulic motors, such as axial piston hydraulic motors, used in conjunction with gearing arrangements with sufficient gear ratios for the required off-highway wheel torques, start with a noticeable jerk. Clocking and cogging motions at very low speeds are an inherent problem with such designs.

Equipment using such high speed low torque axial piston hydraulic motors with relatively high gear ratios have two problems that contribute to the noticeable jerkiness of operation at start up and very low speed operation. One problem is that the dead stop start up mechanical and volumetric efficiencies of high speed low torque hydraulic motors is relatively low as compared to the running efficiencies. Also, the matching gear teeth in gearing arrangements have a higher coefficient of friction at no speed than they do at running speed. The combination of these factors result in a noticeable jerkiness at start up and low initial speeds of such drives on construction equipment. High torque low speed motors have dead stop starting mechanical and volumetric efficiencies much closer to the running efficiencies. In the present invention, by going with high torque low speed motors into a transfer case which transfers the torque to differentials which then send the power on to the wheels, the gear ratios involved are considerably lower than the those that would have been required with high speed low torque axial piston motors.

It is highly desirable for off highway equipment to start and operate smoothly, not only for job requirements, but also for the safety of the operator and the nearby workmen.

The most feasible preferred embodiment of the present invention, by using high torque low speed hydraulic motors with relatively low gear ratios between the hydraulic motors and the driven wheels, achieves smooth starts, smooth low speed operation, and smooth acceleration to the required off highway operational speeds. This is important for the concrete mixer embodiment of the present invention, as it is extremely important for concrete mixing vehicles to have very smooth starting and very smooth low speed, or "inching" capability while unloading concrete out of a chute or off a conveyor belt.

In conventional concrete mixing trucks, discharge conveyors are rear discharge conveyors. By "rear" is meant rear of the truck. These rear discharge conveyors are difficult for the operator to monitor from the cab. While there are discharge chutes on the front end of front discharge type concrete mixing trucks, there are no conveyors. By "front" is meant the front, or cab, end of the truck. The reason there are no conveyors on front discharge type concrete mixing trucks is that such conveyors obstruct the view of the front discharge concrete mixing truck driver while he is driving on the highway.

My invention permits a greater variety of, and more flexible material discharge conveyor arrangements due to the removal of the front cab from the front of the self propelled conrete mixer. Better material discharge conveyor arrangements reduce the number of people required to place the material as it is discharged. This saves manpower as well as reduces the risk of accidents. This is especially true for concrete handling.

One result of my invention is that obsolete unused rear discharge mixers now rusting away in equipment yards around the nation can be used as a source of parts to make front discharge mixer embodiments of the present invention. Front discharge concrete mixers have, in general, obsoleted rear discharge mixers in recent times.

OBJECTS AND ADVANTAGES

Objects and advantages of the present invention include:
- having a combination trailer and self propelled vehicle that combines the maximum gradeability of all wheel drive with the ability to be efficiently and conveniently towed by conventional means at maximum permissible highway speeds,
- obtaining the required wheel torques for the present invention in a way that results in smooth starting and driving operation of the present invention in a practical and economical manner,
- permitting more material handling conveyor options,
- improved safety of operations from the aforementioned items, and
- recycling old obsolete rear discharge concrect mixers into front discharge concrete mixer embodiments of the present invention.

SUMMARY

The present invention, a combination trailer and self propelled vehicle, is a self propelled all hydraulic wheel driven vehicle with a gooseneck that can be towed down the highway by a conventional highway truck tractor with fifth wheel.

The ultimate embodiment of the present invention is to have each wheel driven by a high torque low speed hydraulic motor with brake at each wheel, with an appropriate means of declutching said hydraulic motor from each wheel that engages the ground in the towed condition. While this is possible, it is not presently economically feasible.

The optimum design of the present invention, for gradeablity and smoothness of operation in the self-propelled mode of operation of the present invention, is to have hydraulic motors as close to the wheels as feasible, with a minimum of gearing, and a means of declutching the hydraulic motors while the present invention is being towed.

The preferred embodiment of the present invention has an engine which drives a pump which powers high torque low speed motors driving a transfer case which drives drive shafts to the driven axles, which are conventional axles with conventional differentials, which said axles in turn drive conventional wheels, said wheels having conventional truck brakes.

The transfer case in the preferred embodiment of the present invention has two gear ratios, a neutral position for disengagement of said transfer case from the drive shaft to the ground engaged wheels during the towing mode, and a means of disengaging, or "kicking out", said transfer case from the drive shaft to wheels near the gooseneck end of the present invention which are raised off the ground during the towing mode. Said transfer case is commercially available from a number of companies and is not inventive in itself.

Driving the transfer case in the preferred embodiment of the present invention are two high torque, low speed, hydraulic motors, each with 64 cubic inches of displacement, per revolution, as manufactured by White Hydraulics, Inc. of Hopkinsville, Ky. A Dynapower/Stratopower, unit of General Signal, North Charleston, S.C., 6 cubic inch variable displacement axial piston pump, is used to drive the hydraulic motors in parallel. By "in parallel" is meant the pump flow is split between the two hydraulic motors. One or both of the hydraulic motors includes an integral relief valve to protect the motors from shock loads.

The result is smooth starting, smooth acceleration, and smooth operation at low speeds of the combination trailer and self propelled vehicle in the self propelled mode.

For towing purposes, the present invention is connected to the highway truck tractor in such a manner that the axle or axles nearest the gooseneck are raised off the road surface, so that the present invention is supported at one end by the fifth wheel and the other end by the ground engaging wheels. The transfer case is put into neutral, disengaging the hydraulic motors from the rest of the drive train. The drive shaft to the raised wheels is also disengaged from the drive shaft to the ground engaged wheels. The present invention can then be towed over the highway at maximum permissible speeds.

An alternate embodiment would have been to drive through the existing truck transmission with a high speed low torque axial piston motor. However, the gear ratios involved in low gear, would have resulted in power loss in the gears, and a loss in smoothness of starting and acceleration. Also, the initial starting efficiencies of high speed low torque axial piston motors are lower than those of the high torque low speed motors used.

While the combination trailer and self propelled vehicle is self propelled in both directions, the end nearest the discharge of the concrete mixing drum is called the front end. In the concrete mixing embodiment of the present invention, the operator faces the front, or discharge end of the concrete mixing drum. This facilitates positioning of the combination trailer and self propelled vehicle at the time of delivering the concrete. A conveyor at the discharge end of the mixer is of great value in placing the concrete. As the operator is at the front end of the combination trailer and self propelled vehicle, which is also the discharge end of the concrete mixing drum, which is also where the conveyor is, this is a much more efficient, safe way to deliver concrete as compared to the existing state of the art of delivering concrete at construction sites. This is in addition to the smooth start, smooth low speed operation, and smooth acceleration of the present invention while trying to "inch" or ease into exact positions.

A very important feature of the present invention, is that more desirable dischage conveyor arrangements can be made as compared to conventional concrete trucks. It is not feasible to put a conveyor on a conventional front discharge concrete truck as the conveyor would obstruct the truck driver's view during on highway driving. In the present invention, the conveyor on the discharge end of the concrete drum is behind the operator of the highway truck tractor that is towing said present invention and the invention operates as a front discharge concrete mixer during the self propelled phase as the operator's platform can be located at the discharge end of the mixer, facing the direction of concrete discharge.

In various embodiments of the present invention, the operator's station is located as required for the task at hand.

Also, in the preferred embodiment of the present invention, the wheels elevated above the road surface when the invention is being towed can be equipped with agricultural type lugged tires to maximize traction and gradeability in the off-highway self propelled mode. This would not be feasible if all wheels were on the road surface in the towed mode as excessive wear and noise would be encountered with lugged tires at maximum permissible highway speeds. Conventional equipment tire design is a compromise balancing the need for low noise and high speed usage while on highway and for traction and gradability when off highway. The tire design parameters for on highway driving limit the off highway performance for tires used by conventional equipment.

When converting an existing concrete mixing truck into the present invention, the smaller engine, the cab removal, and the transmission removal, reduces weight, which is desirable for maximizing payload.

While the specificities of the present invention are directed towards a better concrete mixer, the ramifications of the invention go far beyond the concrete mixer. The combination trailer and self propelled vehicle can be used for job-site material handling, a man-lift bucket, a dump bed, fertilizer and lime spreading, logging, piping, material hoppers, oil field equipment, drilling rigs, military purposes, water hauling, irrigation piping, and so on. As the traction and gradeability are quite improved, the present invention also serves as a towing vehicle as required.

DRAWING FIGURES

FIG. 1 illustrates a concrete mixer with front discharge conveyor embodiment of the present invention.

FIGS. 2 through 12 illustrate alternate embodiments of the present invention.

FIG. 13 illustrates the present invention with the best available fluid power drive alternate, a hydraulic pump, attatched to an engine, driving hydraulic motors affixed to the transfer case.

FIG. 14 illustrates an alternate embodiment of the present invention, where a drive shaft from a transfer case to a front axle (as shown in FIG. 13) has been replaced with a hydraulic motor.

FIG. 15 illustrates an alternate embodiment of the present invention whereby a hydraulic motor is driving a transmission which transmits power through a drive shaft to a transfer case.

FIG. 17 illustrates the present invention prior to connection for towing with a highway truck tractor with fifth wheel.

FIG. 18 illustrates the present invention after connection for towing with a highway truck tractor with fifth wheel.

Figure 6:
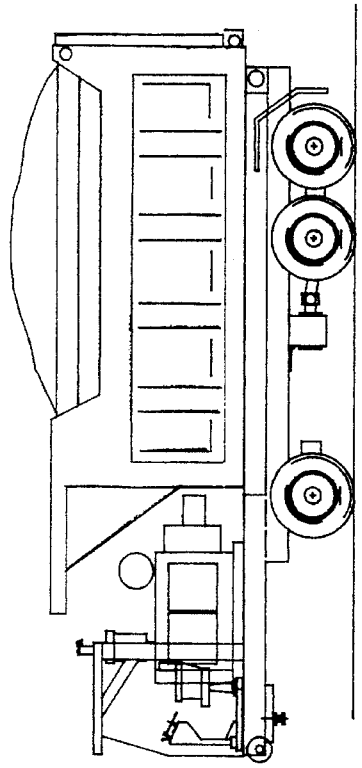
Figure 8:
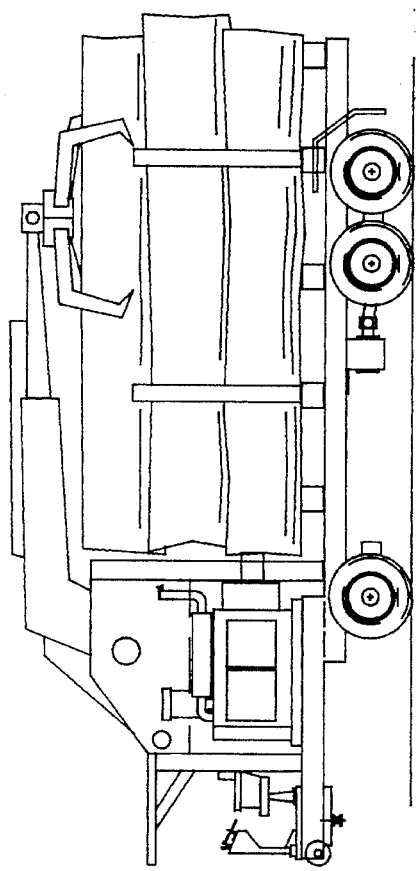
Figure 5:
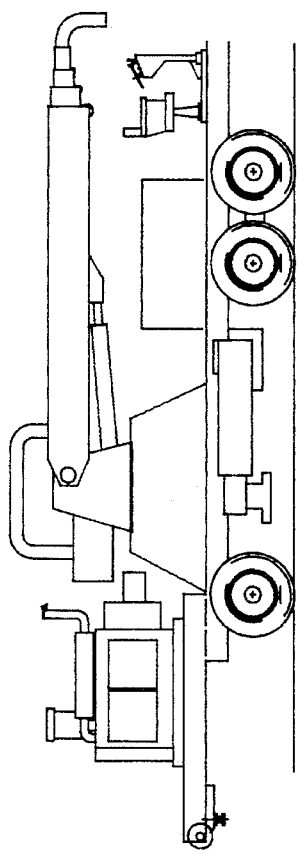
Figure 7:
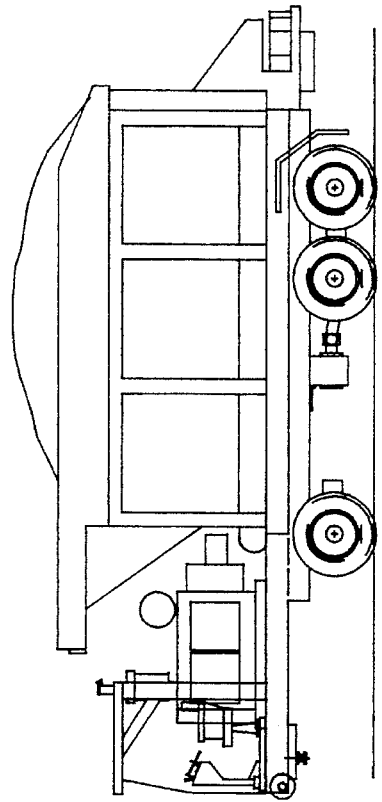
Figure 10:
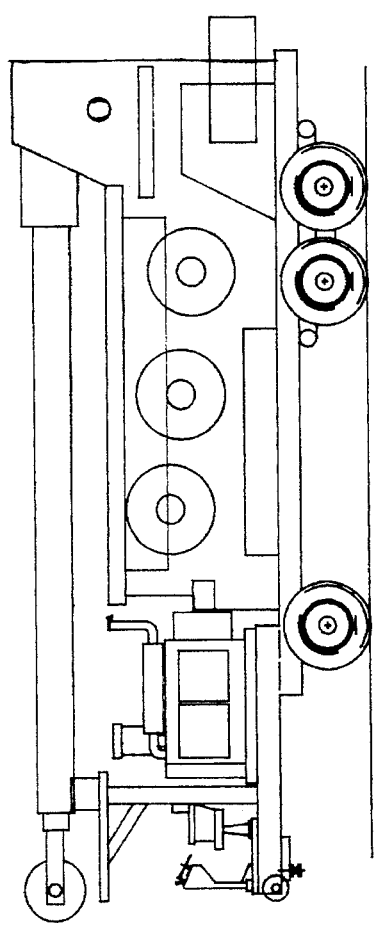
Figure 9:
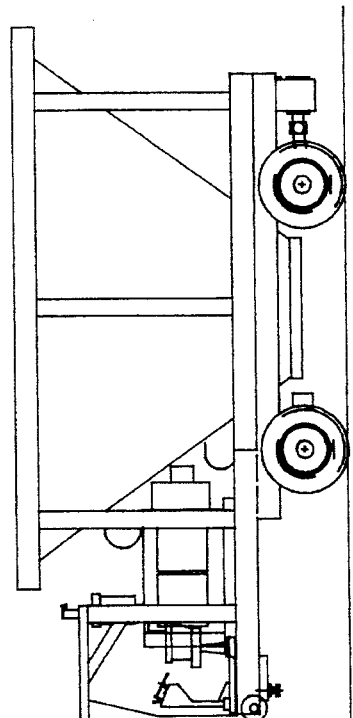
Figure 11:
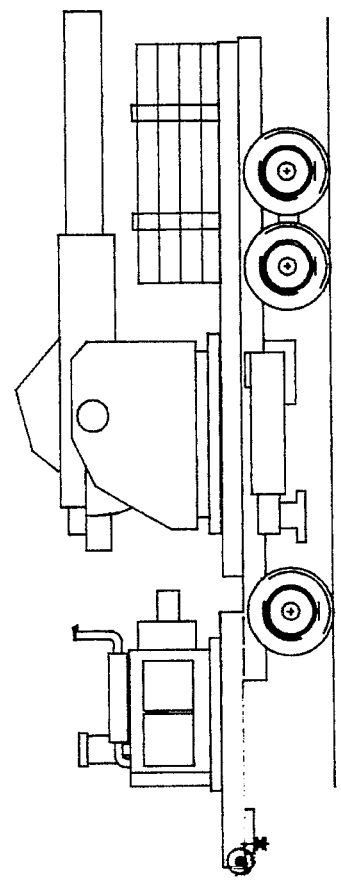

REFERENCE NUMERALS IN DRAWINGS 1. highway truck tractor with fifth wheel
10. combination trailer and self propelled vehicle
11. frame
11a. gooseneck
11b. hydraulic steering cylinder
12. fifth wheel pin
13. roller
20. engine
21. pump
22. transfer case
23. drive shaft
24. wheel
25. hydraulic motor
26. transmission
27. forward wheel
28. transmission drive hydraulic motor
30. control station
32. conveyor
34. concrete mixing drum
100. unpowered trailer
110. rear gooseneck

DETAIL DESCRIPTION WITH RESPECT TO DRAWINGS

FIG. 17 shows a highway truck tractor with fifth wheel 1 in the vicinity of a combination trailer and self propelled vehicle 10. The combination trailer and self propelled vehicle 10 includes a frame 11, with a gooseneck 11a, said gooseneck 11a including a fifth wheel pin 12, and a roller 13. The fifth wheel pin 12 is common to the state of the art of connecting towed trailers to to towing vehicles. However, the roller 13 has been added to the conventional arrangements so as to reduce the friction that would have been encountered engaging the combination trailer and self propelled vehicle 10 to the highway truck tractor with fifth wheel 1. FIG. 18 shows the combination trailer and self propelled vehicle 10 connected to the highway tractor with fifth wheel 1 in a towing position with a conventional fifth wheel connection.

Figure 12:
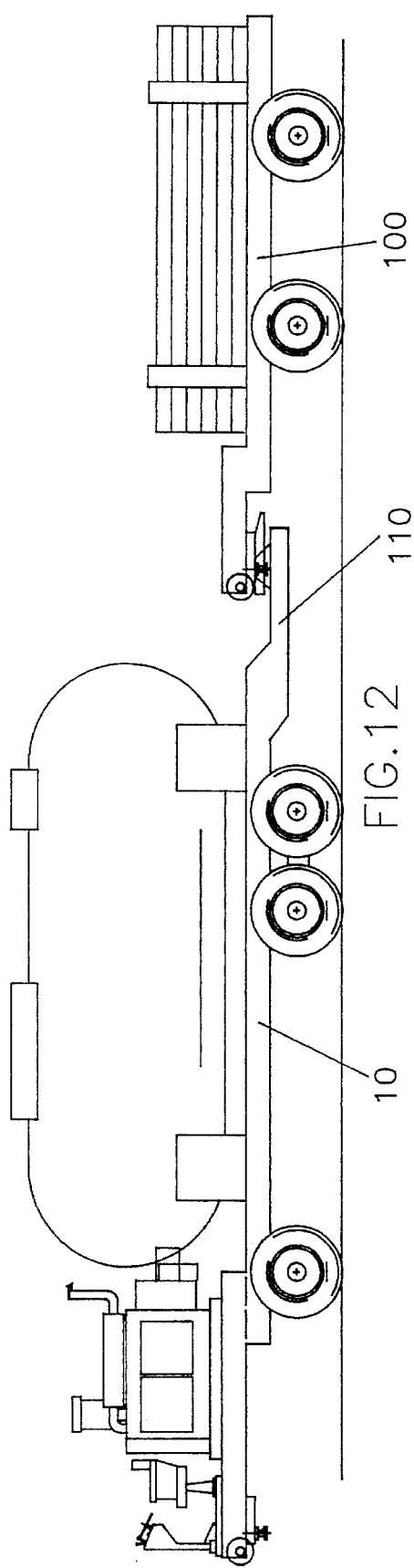

FIGS. 2 through 12 show appropriately labeled alternate embodiments of the present invention. The ground tractive effort attained by the present invention is such that it is quite feasible, on occasion to add a rear gooseneck 110 to pull an unpowered trailer 100 as shown in FIG. 12.

FIG. 13 illustrates the preferred self propelled embodiment of the combination trailer and self propelled vehicle 10. An engine 20 drives a pump 21 which powers two hydraulic motors 25 into a transfer case 22 which transfers torque to drive shafts 23 to power conventional truck axles with differentials (not shown) driving the various wheels 24 and forward wheels 27. The preferred embodiment of the hydraulic motors 25 is a pair of DT66 model, high torque low speed motors, 64 cubic inch per revolution in displacement, as manufactured by White Hydraulics in Hopkinsville, Ky. Similar hydraulic motors are manufactured by Eaton Corp. in the U.S. and Danfoss in Denmark.

An alternate embodiment of the present invention is shown in FIG. 15. In FIG. 15, the engine 20 drives the pump 21 which powers a transmission drive hydraulic motor 28, which drives a transmission 26 which then transmits torque to a drive shaft 23 which powers the transfer case 22 which then transfers torque to the drive shafts 23 to power the conventional truck axles with differentials (not shown) powering the various wheels 24 and forward wheels 27. The preferred embodiment of the transmission drive motor 28 would be an axial piston motor such as is made by Sauer Sundstrand Corp in Ames, Iowa.

An alternate embodiment of the present invention would be as shown in FIG. 14. FIG. 14 differs from FIG. 13 in that the drive shaft 23 to the forward axle has been replaced, in FIG. 14 with a hydraulic motor 25.

An ultimate embodiment would be to have the wheels 24 and the forward wheels 27 each driven by a high torque low speed hydraulic motor incorporating a means of declutching said high torque low speed motor from a given wheel as well as a means of braking the vehicle. This is beyond economic feasibility at the present time, but were such an ideal hydraulic motor available at reasonable cost, it would be the ultimate embodiment.

Figure 16:
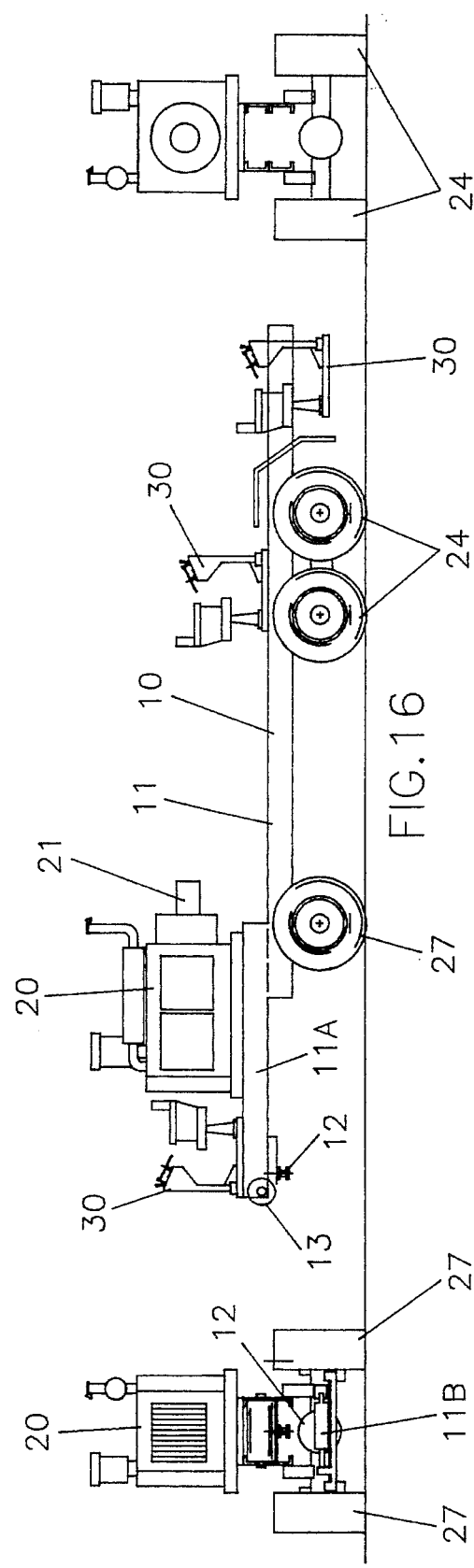
FIG. 16 illustrates an embodiment of the present invention with a hydraulic steering cylinder and also a control station at alternate positions.

In FIG. 16, the combination trailer and self propelled vehicle 10 illustrates a control station 30 in various locations. The control station 30 can be moved to any number of positions as the operation of the present invention requires. FIG. 16 also shows a hydraulic steering cylinder 11b which is a means for hydraulic steering of the forward wheels 27 in the preferred embodiment of the present invention. Alternate hydraulic steering embodiments exist, such as rotary actuators or hydraulic motors with gearing arrangements, for example.

FIG. 1 illustrates the present invention as a platform for a concrete mixing drum 34, complete with a conveyor 32 and a control station 30. The control station 30 serves as the operator's platform. The conveyor 32 and the control station 30 are located at the discharge end of the concrete mixing from 34. As previously mentioned, an advantage of the present invention over conventional front discharge concrete trucks is that conveyors cannot be put on the front of the conventional front discharge concrete trucks without impeding the view of the truck driver while driving on highway. Having a conveying means as a part of the concrete mixer that moves with the vehicle located where the driver of the vehicle can watch it is a tremendous step forward, not possible with conventional front discharge concrete mixers. With conveying arrangements on rear discharge concrete mixers, the operator has to leave his control station to watch the operation or else depend on additional help in a very noisy environment. In the current state of the art concrete mixing trucks, the mixers that discharge out the front end of the vehicle, i.e. in the direction the operator faces, conveyors impede the operators vision while driving the concrete mixing truck down the highway. Conveyors are only used, currently, on rear discharge concrete mixing trucks for that reason. When the embodiment shown in FIG. 1, is towed in the manner as previously discussed and as indicated in FIG. 18 the conveyor 32 is behind the truck driver towing the embodiment illustrated, so the forward vision of the truck driver is not impeded during highway driving.

Although the description above contains many specificities, these should not be construed as limiting the scope of the invention but as merely providing illustrations of some of the presently preferred embodiments of the invention. For example, as more hydraulic motor alternatives become available, it may become more feasible to place the hydraulic motors in other locations in the drive train of the combination trailer and self propelled vehicle. To be more specific, todays best embodiment of the present invention is to use two high torque low speed hydraulic motors driving the transfer case. Tomorrows best embodiment, as the larger displacement high torque low speed hydraulic motors become more economical and more compact, could well be applied to the axle differentials, or even direct driving each wheel. Currently, the required displacement motors plus the declutching and braking arrangements required for direct driving the wheels are less feasible, from a cost standpoint, than the embodiments shown. Another example of specificity, is the hydraulic steering cylinder 11b, where alternatives are available, as previously mentioned.

I claim:

1. A combination trailer and self propelled vehicle which is both towable as well as self propelled comprising:
   a) a hydraulic drive system providing an all wheel drive,
   b) an engine powering said hydraulic drive system,
   c) a means of decoupling said hydraulic drive system from said wheels, and
   d) a means of hydraulic steering of said combination trailer and self propelled vehicle.

2. The combination trailer and self propelled vehicle of claim 1 further comprising a concrete mixer.

3. The combination trailer and self propelled vehicle of claim 1 wherein said combination trailer and self propelled vehicle also includes:
   a) a concrete mixer, and
   b) a control station that serves as the operator's platform such that the operator is controlling the said combination trailer and self propelled vehicle from the concrete mixer discharge end of the said combination trailer and self propelled vehicle.

4. The combination trailer and self propelled vehicle of claim 3 wherein said combination trailer and self propelled vehicle also includes a conveyor at the discharge end of the concrete mixer.

5. The combination trailer and self propelled vehicle of claim 1 with a means of reducing friction while joining the said combination trailer and self propelled vehicle to a highway truck tractor which consists of a roller or rollers in the vicinity of the fifth wheel pin of the said combination trailer and self propelled vehicle.

6. The combination trailer and self propelled vehicle of claim 1 wherein said combination trailer and self propelled vehicle also includes
   a) a transfer case,
   b) one or more drive shafts, driven by the transfer case, and
   c) one or more high torque low speed hydraulic motors, said motors providing torque into the transfer case.

7. A towable self propelled vehicle comprising:
   a) a hydraulic drive system providing an all wheel drive,
   b) an engine powering said hydraulic drive system,
   c) a means of decoupling said hydraulic drive system from said wheels, and
   d) a means of hydraulic steering of said towable self propelled vehicle.

8. The towable self propelled vehicle of claim 7 further comprising a concrete mixer.

9. The towable self propelled vehicle of claim 7 which also includes:
   a) a concrete mixer, and
   b) a control station that serves as the operator's platform such that the operator is controlling the said towable self propelled vehicle from the concrete mixer discharge end of the towable self propelled vehicle.

10. The towable self propelled vehicle of claim 9 wherein the towable self propelled vehicle also includes a conveyor at the discharge end of the concrete mixer.

11. The towable self propelled vehicle of claim 7 wherein said towable self propelled vehicle also includes:
   a) a transfer case
   b) one of more drive shafts, driven by the transfer case, and
   c) one or more high torque low speed hydraulic motors, said motors providing torque into the transfer case.

* * * * *